US012567984B2

(12) United States Patent
Zhou et al.

(10) Patent No.: US 12,567,984 B2
(45) Date of Patent: Mar. 3, 2026

(54) PASSWORD RECOVERY METHOD AND SYSTEM, AND CLOUD SERVER AND ELECTRONIC DEVICE

(71) Applicant: HANGZHOU HIKVISION DIGITAL TECHNOLOGY CO., LTD., Hangzhou (CN)

(72) Inventors: Ming Zhou, Hangzhou (CN); Kezhang Lin, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 680 days.

(21) Appl. No.: 17/920,879

(22) PCT Filed: Apr. 28, 2021

(86) PCT No.: PCT/CN2021/090666
§ 371 (c)(1),
(2) Date: Oct. 24, 2022

(87) PCT Pub. No.: WO2021/227879
PCT Pub. Date: Nov. 18, 2021

(65) Prior Publication Data
US 2023/0171248 A1 Jun. 1, 2023

(30) Foreign Application Priority Data
May 9, 2020 (CN) .......................... 202010385159.5

(51) Int. Cl.
*H04L 9/32* (2006.01)
*H04L 9/40* (2022.01)
(52) U.S. Cl.
CPC ........ *H04L 9/3271* (2013.01); *H04L 63/0876* (2013.01)

(58) Field of Classification Search
CPC . H04L 9/3271; H04L 63/0876; H04L 9/3226; H04L 63/0428; H04L 63/08;
(Continued)

(56) References Cited

U.S. PATENT DOCUMENTS

2012/0128267 A1* 5/2012 Dugan ................. G06Q 30/016
382/321
2014/0108810 A1 4/2014 Chenna
(Continued)

FOREIGN PATENT DOCUMENTS

CN 1731408 A 2/2006
CN 103875211 A 6/2014
(Continued)

OTHER PUBLICATIONS

First Office Action in corresponding Japanese Application No. 2022-550953 issued on Sep. 19, 2023.
(Continued)

*Primary Examiner* — Trong H Nguyen
(74) *Attorney, Agent, or Firm* — Meunier Carlin & Curfman, LLC

(57) ABSTRACT
A password recovery method, system, cloud server and electronic device. The method includes: a cloud server receives a login password recovery request for a device sent by a cloud service client which carries a device serial number and an encryption challenge string; wherein, the encryption challenge string is encrypted by a password recovery verification code randomly generated by the device; the cloud server determines whether the device serial number is bound to a cloud service account of the cloud service client, and the encryption challenge string is sent to a password server when it is determined that the device serial number is bound to a cloud service account of the cloud service client; the cloud server receives the password recovery verification code decrypted from the encryption challenge string returned by the password server, and sends the password recovery verification code to the cloud service client, so that the cloud service client can display the
(Continued)

Cloud Sever

Electronic device

Password recovery system password recovery verification code to the user. The embodiments of the present application improve the convenience and reliability of the device login password recovery.

13 Claims, 6 Drawing Sheets

(58) Field of Classification Search
CPC . H04L 63/083; H04L 9/0894; H04L 63/0815; H04L 9/40; H04L 67/05; G06F 21/30; H04W 12/06; H04W 12/77
See application file for complete search history.

(56) References Cited

U.S. PATENT DOCUMENTS

2015/0295714 A1    10/2015  Liu
2016/0149886 A1*   5/2016  Korokithakis .......... G06F 21/36
                                                726/6

FOREIGN PATENT DOCUMENTS

| CN | 108400982 | A |   | 8/2018 | |
|----|-----------|---|---|--------|---|
| CN | 110941810 | A | * | 3/2020 | ............. G06F 21/36 |
| CN | 112347458 | A |   | 2/2021 | |
| JP | 11212922 | A |   | 8/1999 | |
| JP | 2001212922 | A |   | 8/2001 | |
| JP | 2001290776 | A |   | 10/2001 | |
| JP | 2005332093 | A |   | 12/2005 | |
| WO | 2020077415 | A1 |   | 4/2020 | |

OTHER PUBLICATIONS

International Search Report and Written Opinion, dated Jul. 29, 2021, received in connection with corresponding International Patent Application No. PCT/CN2021/090666.

* cited by examiner

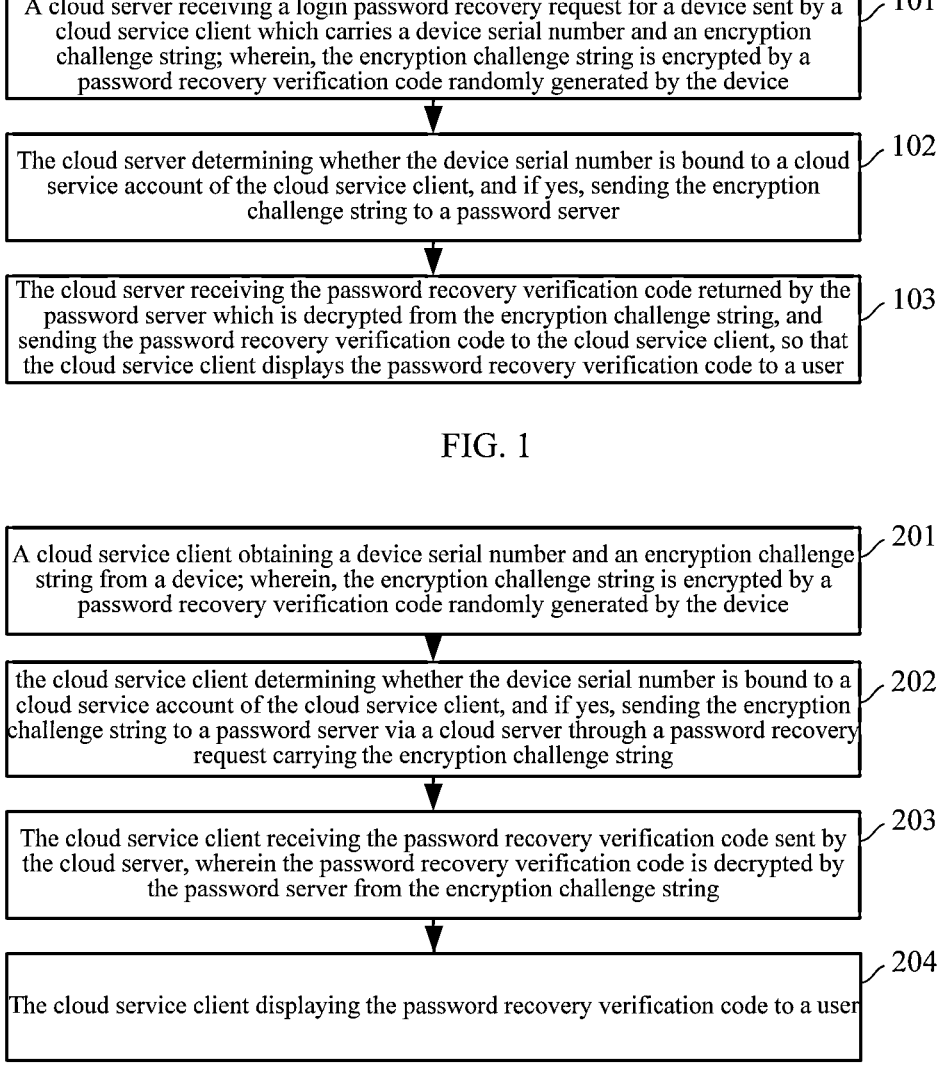

A cloud server receiving a login password recovery request for a device sent by a cloud service client which carries a device serial number and an encryption challenge string; wherein, the encryption challenge string is encrypted by a password recovery verification code randomly generated by the device — 101

The cloud server determining whether the device serial number is bound to a cloud service account of the cloud service client, and if yes, sending the encryption challenge string to a password server — 102

The cloud server receiving the password recovery verification code returned by the password server which is decrypted from the encryption challenge string, and sending the password recovery verification code to the cloud service client, so that the cloud service client displays the password recovery verification code to a user — 103

FIG. 1

A cloud service client obtaining a device serial number and an encryption challenge string from a device; wherein, the encryption challenge string is encrypted by a password recovery verification code randomly generated by the device — 201 the cloud service client determining whether the device serial number is bound to a cloud service account of the cloud service client, and if yes, sending the encryption challenge string to a password server via a cloud server through a password recovery request carrying the encryption challenge string — 202

The cloud service client receiving the password recovery verification code sent by the cloud server, wherein the password recovery verification code is decrypted by the password server from the encryption challenge string — 203

The cloud service client displaying the password recovery verification code to a user — 204

FIG. 2

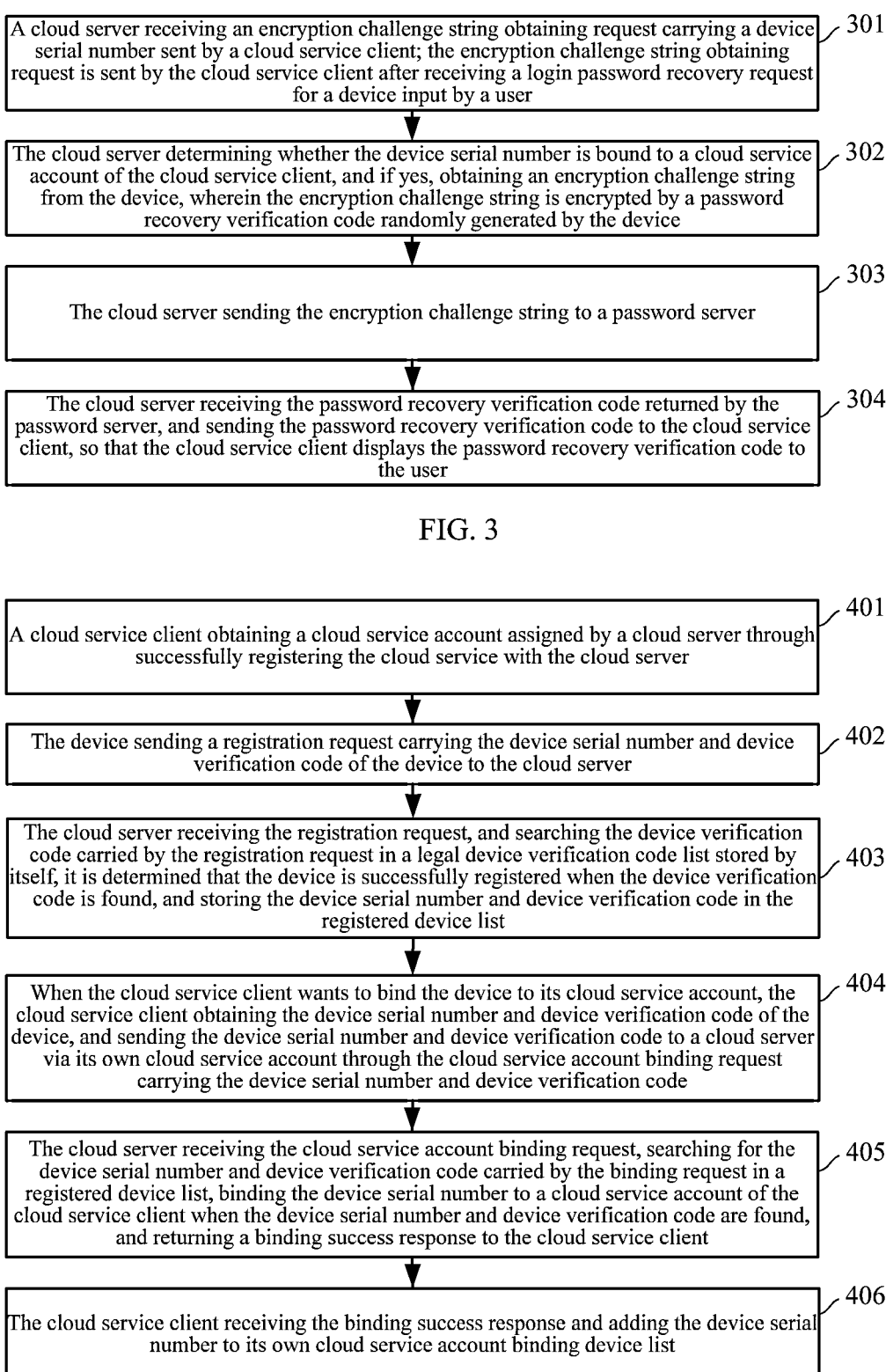

A cloud server receiving an encryption challenge string obtaining request carrying a device serial number sent by a cloud service client; the encryption challenge string obtaining request is sent by the cloud service client after receiving a login password recovery request for a device input by a user ⟋ 301

The cloud server determining whether the device serial number is bound to a cloud service account of the cloud service client, and if yes, obtaining an encryption challenge string from the device, wherein the encryption challenge string is encrypted by a password recovery verification code randomly generated by the device ⟋ 302

The cloud server sending the encryption challenge string to a password server ⟋ 303

The cloud server receiving the password recovery verification code returned by the password server, and sending the password recovery verification code to the cloud service client, so that the cloud service client displays the password recovery verification code to the user ⟋ 304

FIG. 3

A cloud service client obtaining a cloud service account assigned by a cloud server through successfully registering the cloud service with the cloud server ⟋ 401

The device sending a registration request carrying the device serial number and device verification code of the device to the cloud server ⟋ 402

The cloud server receiving the registration request, and searching the device verification code carried by the registration request in a legal device verification code list stored by itself, it is determined that the device is successfully registered when the device verification code is found, and storing the device serial number and device verification code in the registered device list ⟋ 403

When the cloud service client wants to bind the device to its cloud service account, the cloud service client obtaining the device serial number and device verification code of the device, and sending the device serial number and device verification code to a cloud server via its own cloud service account through the cloud service account binding request carrying the device serial number and device verification code ⟋ 404

The cloud server receiving the cloud service account binding request, searching for the device serial number and device verification code carried by the binding request in a registered device list, binding the device serial number to a cloud service account of the cloud service client when the device serial number and device verification code are found, and returning a binding success response to the cloud service client ⟋ 405

The cloud service client receiving the binding success response and adding the device serial number to its own cloud service account binding device list ⟋ 406

FIG. 4

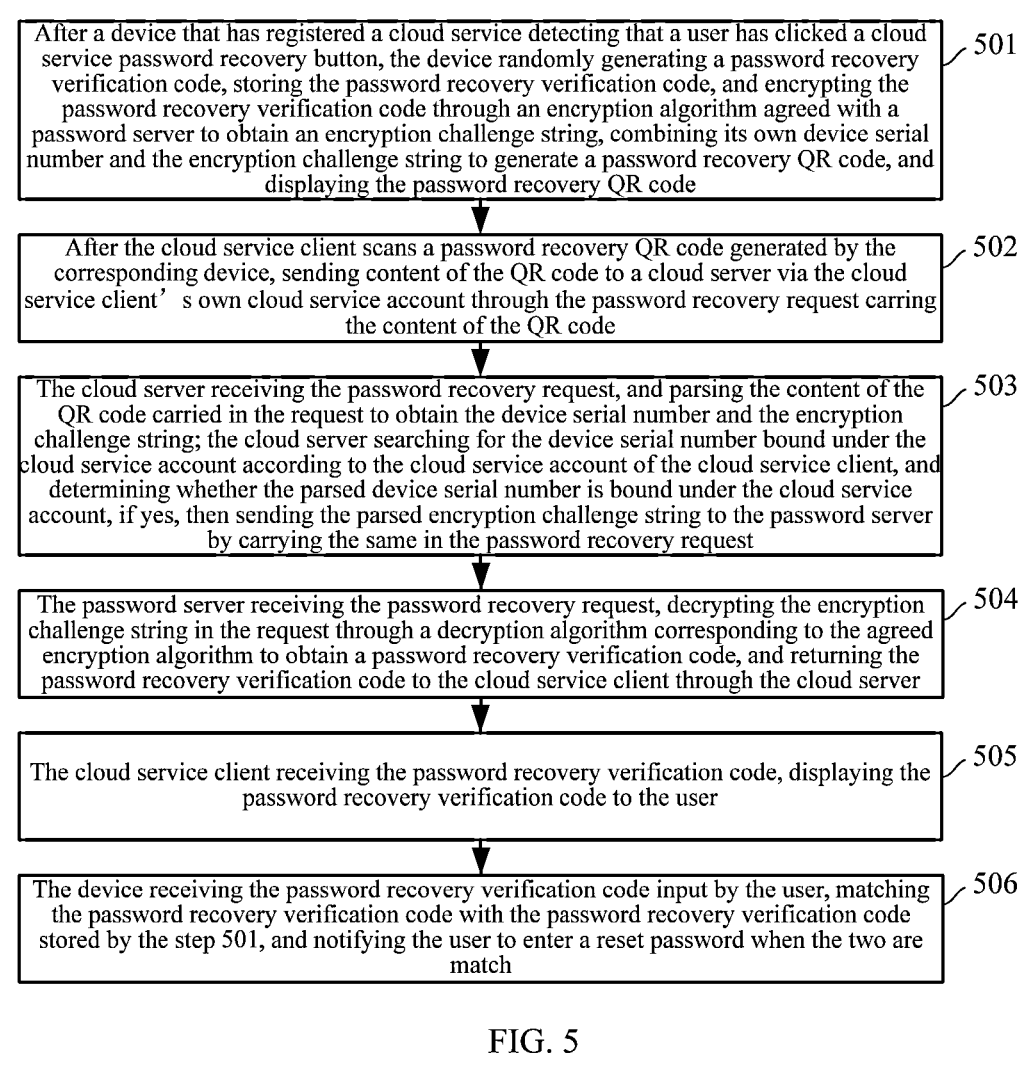

After a device that has registered a cloud service detecting that a user has clicked a cloud service password recovery button, the device randomly generating a password recovery verification code, storing the password recovery verification code, and encrypting the password recovery verification code through an encryption algorithm agreed with a password server to obtain an encryption challenge string, combining its own device serial number and the encryption challenge string to generate a password recovery QR code, and displaying the password recovery QR code ⟋501

After the cloud service client scans a password recovery QR code generated by the corresponding device, sending content of the QR code to a cloud server via the cloud service client's own cloud service account through the password recovery request carring the content of the QR code ⟋502

The cloud server receiving the password recovery request, and parsing the content of the QR code carried in the request to obtain the device serial number and the encryption challenge string; the cloud server searching for the device serial number bound under the cloud service account according to the cloud service account of the cloud service client, and determining whether the parsed device serial number is bound under the cloud service account, if yes, then sending the parsed encryption challenge string to the password server by carrying the same in the password recovery request ⟋503

The password server receiving the password recovery request, decrypting the encryption challenge string in the request through a decryption algorithm corresponding to the agreed encryption algorithm to obtain a password recovery verification code, and returning the password recovery verification code to the cloud service client through the cloud server ⟋504

The cloud service client receiving the password recovery verification code, displaying the password recovery verification code to the user ⟋505

The device receiving the password recovery verification code input by the user, matching the password recovery verification code with the password recovery verification code stored by the step 501, and notifying the user to enter a reset password when the two are match ⟋506

FIG. 5

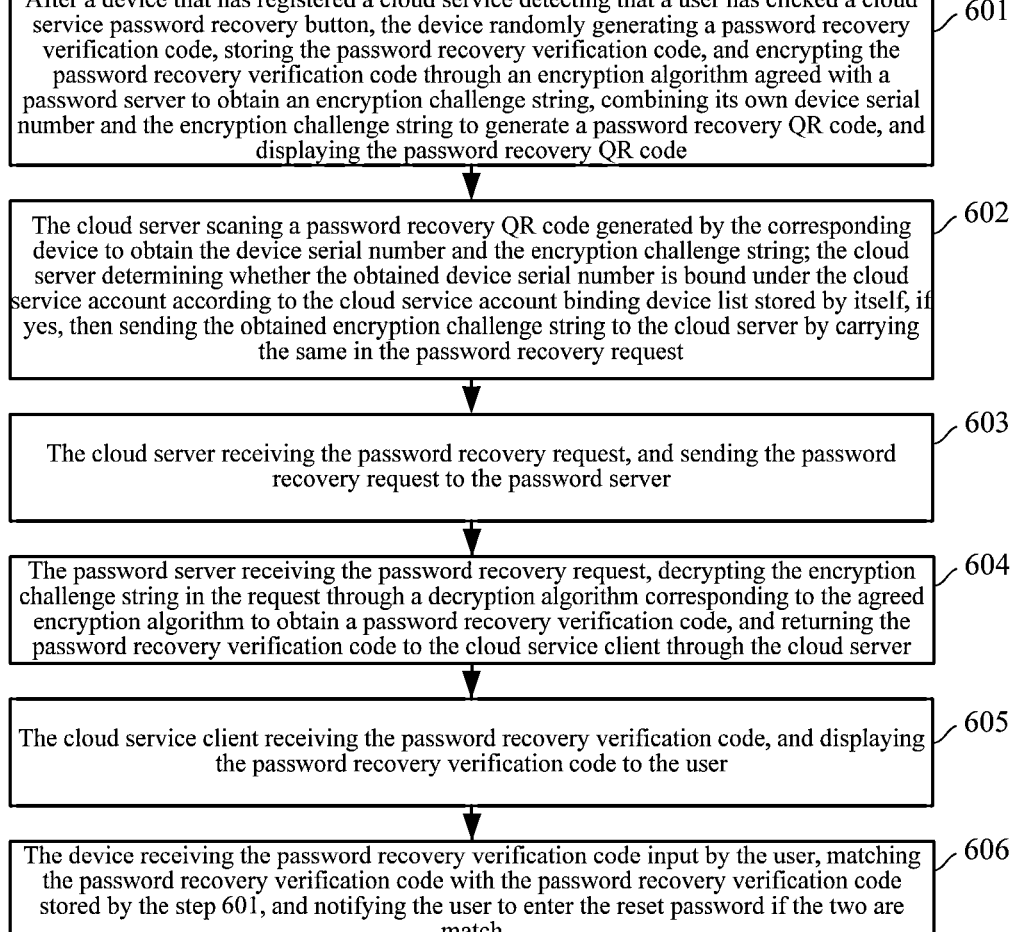

After a device that has registered a cloud service detecting that a user has clicked a cloud service password recovery button, the device randomly generating a password recovery verification code, storing the password recovery verification code, and encrypting the password recovery verification code through an encryption algorithm agreed with a password server to obtain an encryption challenge string, combining its own device serial number and the encryption challenge string to generate a password recovery QR code, and displaying the password recovery QR code

601

The cloud server scaning a password recovery QR code generated by the corresponding device to obtain the device serial number and the encryption challenge string; the cloud server determining whether the obtained device serial number is bound under the cloud service account according to the cloud service account binding device list stored by itself, if yes, then sending the obtained encryption challenge string to the cloud server by carrying the same in the password recovery request

602

The cloud server receiving the password recovery request, and sending the password recovery request to the password server

603

The password server receiving the password recovery request, decrypting the encryption challenge string in the request through a decryption algorithm corresponding to the agreed encryption algorithm to obtain a password recovery verification code, and returning the password recovery verification code to the cloud service client through the cloud server

604

The cloud service client receiving the password recovery verification code, and displaying the password recovery verification code to the user

605

The device receiving the password recovery verification code input by the user, matching the password recovery verification code with the password recovery verification code stored by the step 601, and notifying the user to enter the reset password if the two are match

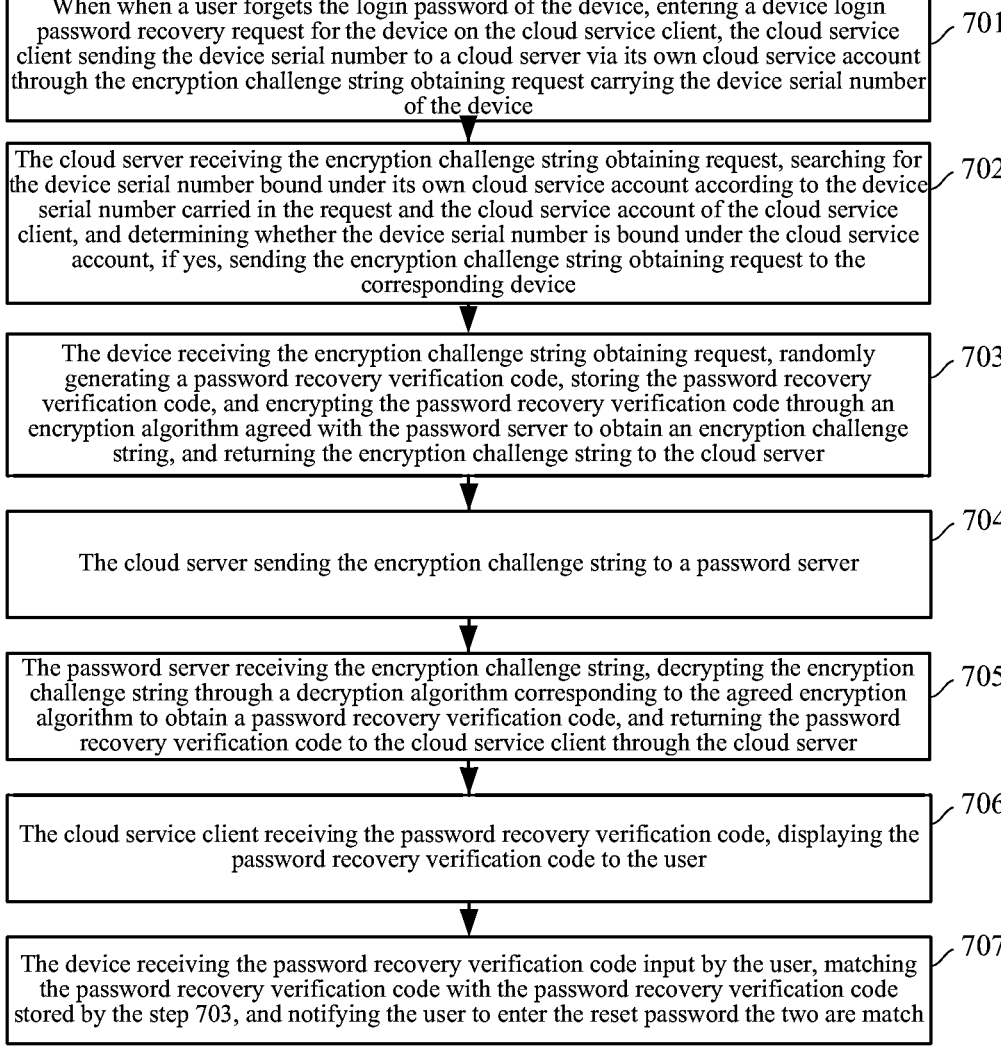

| When when a user forgets the login password of the device, entering a device login password recovery request for the device on the cloud service client, the cloud service client sending the device serial number to a cloud server via its own cloud service account through the encryption challenge string obtaining request carrying the device serial number of the device | 701 |

| The cloud server receiving the encryption challenge string obtaining request, searching for the device serial number bound under its own cloud service account according to the device serial number carried in the request and the cloud service account of the cloud service client, and determining whether the device serial number is bound under the cloud service account, if yes, sending the encryption challenge string obtaining request to the corresponding device | 702 |

| The device receiving the encryption challenge string obtaining request, randomly generating a password recovery verification code, storing the password recovery verification code, and encrypting the password recovery verification code through an encryption algorithm agreed with the password server to obtain an encryption challenge string, and returning the encryption challenge string to the cloud server | 703 |

| The cloud server sending the encryption challenge string to a password server | 704 |

| The password server receiving the encryption challenge string, decrypting the encryption challenge string through a decryption algorithm corresponding to the agreed encryption algorithm to obtain a password recovery verification code, and returning the password recovery verification code to the cloud service client through the cloud server | 705 |

| The cloud service client receiving the password recovery verification code, displaying the password recovery verification code to the user | 706 |

| The device receiving the password recovery verification code input by the user, matching the password recovery verification code with the password recovery verification code stored by the step 703, and notifying the user to enter the reset password the two are match | 707 |

FIG. 7

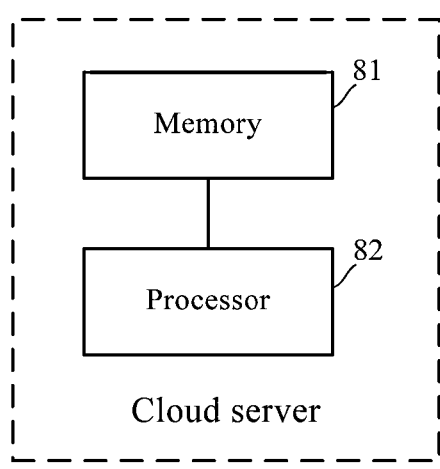

Memory 81

Processor 82

Cloud server

FIG. 8

PASSWORD RECOVERY METHOD AND SYSTEM, AND CLOUD SERVER AND ELECTRONIC DEVICE

The present application claims the priority to a Chinese patent application No. 202010385159.5 filed with the China National Intellectual Property Administration on May 9, 2020 and entitled "PASSWORD RECOVERY METHOD AND SYSTEM, AND CLOUD SERVER AND ELECTRONIC DEVICE", which is incorporated herein by reference in its entirety.

TECHNICAL FIELD

The present application relates to the technical field of password, and in particular, to a password recovery method, system, cloud server and electronic device.

BACKGROUND

Password recovery refers to resetting a new password through a certain authentication method when a user forgets the password.

In the related art, when the user forgets the device login password, the password can be reset by answering a previously set question, or through a previously bound mobile phone number, or through a previously bound email address, etc. Wherein, the manner answering the previously set question, requires the user to remember the question and answer set by himself; the manner through the previously bound mobile phone number or the previously bound email address, requires the user to bind the mobile phone number or email address during registration activation or login in, and then obtain a verification code through the mobile phone or email to recover the password when forgetting the password. The above methods have the following disadvantages:

1. for the manner of answering a question, the user first need to set a question and an answer, then the user must remember the question and the answer set at that time, and it is easy to forget them after a long time;
2. for the manner of retrieve through a mobile phone number or an email, the bound mobile phone number or email address may be changed, in addition, some users may not necessarily bind the mobile phone number and email address in advance, and it is too late to set it when they want to recovery the password.

SUMMARY

The embodiments of the present application propose a password recovery method, system, cloud server, and electronic device, so as to improve the convenience and reliability of login password recovery of a device.

The technical solutions of the embodiments of the present application are implemented as follows.

In a first aspect, an embodiment of the present application provides a password recovery method, which includes:

a cloud server receiving a login password recovery request for a device sent by a cloud service client which carries a device serial number and an encryption challenge string; wherein, the encryption challenge string is encrypted by a password recovery verification code randomly generated by the device;

the cloud server determining whether the device serial number is bound to a cloud service account of the cloud service client, and sending the encryption challenge string to a password server when it is determined that the device serial number is bound to a cloud service account of the cloud service client;

the cloud server receiving the password recovery verification code returned by the password server which is decrypted from the encryption challenge string, and sending the password recovery verification code to the cloud service client, so that the cloud service client displays the password recovery verification code to a user.

In a possible implementation, before the cloud server receiving a login password recovery request for a device by the cloud service client which carries a device serial number and an encryption challenge string, the method further includes:

the cloud server receiving a cloud service account binding request carrying the device serial number of the device and a device verification code sent by the cloud service client;

the cloud server searching for the device serial number and the device verification code in a registered device list stored by itself, and binding the device serial number to the cloud service account of the cloud service client when the device serial number and the device verification code are found.

In a second aspect, an embodiment of the present application provides a password recovery method, which includes:

a cloud service client obtaining a device serial number and an encryption challenge string from a device; wherein, the encryption challenge string is encrypted by a password recovery verification code randomly generated by the device;

the cloud service client determining whether the device serial number is bound to a cloud service account of the cloud service client, and sending the encryption challenge string to a password server via a cloud server through a password recovery request carrying the encryption challenge string when it is determined that the device serial number is bound to a cloud service account of the cloud service client;

the cloud service client receiving the password recovery verification code sent by the cloud server, wherein the password recovery verification code is decrypted by the password server from the encryption challenge string;

the cloud service client displaying the password recovery verification code to a user.

In a possible implementation, before the cloud service client receiving a device login password recovery request for a device input by a user, the method further includes:

the cloud service client sending a cloud service account binding request carrying the device serial number and the device verification code of the device to the cloud server;

the cloud service client receiving a binding success response returned by the cloud server, and adding the device serial number to its own cloud service account binding device list.

In a third aspect, an embodiment of the present application provides a password recovery method, which includes:

a cloud server receiving an encryption challenge string obtaining request carrying a device serial number sent by a cloud service client; the encryption challenge string obtaining request is sent by the cloud service client after receiving a device login password recovery request for a device input by a user;

the cloud server determining whether the device serial number is bound to a cloud service account of the cloud service client, and obtaining an encryption challenge string from the device when it is determined that the device serial number is bound to a cloud service account of the cloud service client, wherein the encryption challenge string is encrypted by a password recovery verification code randomly generated by the device;

the cloud server sending the encryption challenge string to a password server;

the cloud server receiving the password recovery verification code returned by the password server, and sending the password recovery verification code to the cloud service client, so that the cloud service client displays the password recovery verification code to the user.

In a possible implementation, before the cloud server receiving an encryption challenge string obtaining request sent by the cloud service client which carries a device serial number, the method further includes:

the cloud server receiving a cloud service account binding request carrying the device serial number and the device verification code of the device sent by the cloud service client;

the cloud server searching for the device serial number and the device verification code in a registered device list stored by itself, and binding the device serial number to a cloud service account of the cloud service client when the device serial number and the device verification code are found.

In a fourth aspect, an embodiment of the present application provides a password recovery method, which includes:

after a device that has registered a cloud service detecting that a user has clicked a cloud service password recovery button, the device randomly generating a password recovery verification code, storing the password recovery verification code, and encrypting the password recovery verification code through an encryption algorithm agreed with a password server to obtain an encryption challenge string, combining its own device serial number and the encryption challenge string to generate a password recovery QR code, and displaying the password recovery QR code;

a cloud service client scanning the password recovery QR code of the device to obtain the device serial number and encryption challenge string of the device, generating a device login password recovery request carrying the device serial number and the encryption challenge string of the device, and sending the device login password recovery request to a cloud server through the cloud service client's own cloud service account;

the cloud server receiving the device login password recovery request, and parsing the device login password recovery request to obtain the device serial number and the encryption challenge string of the device;

the cloud server determining whether the cloud service account is bound with the device serial number according to the cloud service account of the cloud service client, and parsing the encryption challenge string to obtain a parsed password recovery verification code when it is determined that the cloud service account is bound with the device serial number, and sending the parsed password recovery verification code to the cloud server client;

the cloud server client receiving the parsed password recovery verification code, and displaying the parsed password recovery verification code;

the device receiving the parsed password recovery verification code input by the user, matching the password recovery verification code input by the user with the password recovery verification code stored by itself, and entering a password reset process when the password recovery verification code input by the user is matched with the password recovery verification code stored by itself.

In a fifth aspect, an embodiment of the present application provides a cloud server, including: a processor and a memory accessible to the processor, instructions are stored in the memory, which, when executed by the processor, cause the processor to implement any one of the password recovery methods described in the present application.

In a sixth aspect, an embodiment of the present application provides an electronic device, including: a processor and a memory accessible to the processor, instructions are stored in the memory, which, when executed by the processor, cause the processor to implement any one of the password recovery methods described in the present application.

In one possible implementation, the electronic device is a fixed terminal or a mobile terminal.

In a seventh aspect, an embodiment of the present application provides a password recovery system, including: the cloud server as described in any of the above, and the electronic device as described in any of the above.

In the embodiments of the present application, when a user forgets the device login password, for the cloud service account to which the device is bound, during recovering the device login password, the binding relationship is verified by the cloud server or by the cloud service client using the cloud service account, if the verification is passed, the encryption challenge string encrypted by the password recovery verification code randomly generated by the device will be sent to the password server for decryption to obtain the password recovery verification code, so that the device login password recovery can be realized without any presetting by the user, which improves the convenience and reliability of the password recovery.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

FIG. 1 is a flow diagram of a password recovery method provided by a first embodiment of the present application;

FIG. 2 is a flow diagram of a password recovery method provided by a second embodiment of the present application;

FIG. 3 is a flow diagram of a password recovery method provided by a third embodiment of the present application;

FIG. 4 is a flow diagram of a method for binding a cloud service account to a device provided by a fourth embodiment of the present application;

FIG. 5 is a flow diagram of a password recovery method provided by a fifth embodiment of the present application;

FIG. 6 is a flow diagram of a password recovery method provided by a sixth embodiment of the present application;

FIG. 7 is a flow diagram of a password recovery method provided by a seventh embodiment of the present application;

FIG. 8 is a schematic structure diagram of a cloud server provided by an embodiment of the present application;

DETAILED DESCRIPTION

Figure 9:
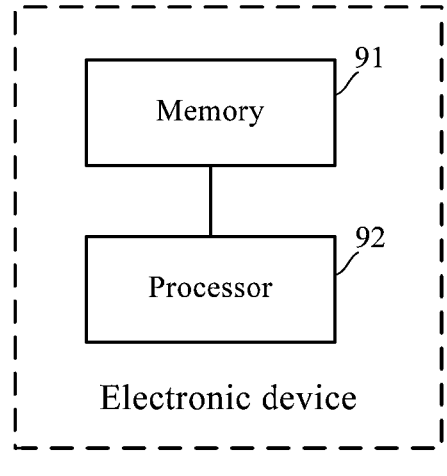
FIG. 9 is a schematic structure diagram of an electronic device provided by an embodiment of the present application.

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

FIG. 1 is a flow diagram of a password recovery method provided by a first embodiment of the present application, and its specific steps are as follows.

Step 101: a cloud server receiving a login password recovery request for a device sent by a cloud service client which carries a device serial number and an encryption challenge string; wherein, the encryption challenge string is encrypted by a password recovery verification code randomly generated by the device.

When the user wants to retrieve a password, the user obtains the encryption challenge string and the device serial number from the device through the cloud service client, wherein the device serial number is used to uniquely identify the device, and the encryption challenge string is encrypted by a password recovery verification code randomly generated by the device, an algorithm for encrypting the encryption challenge string can be an encryption algorithm in the related technology, which is not specifically limited here. After obtaining the device serial number and the encryption challenge string, the cloud service client can generate a login password recovery request of a device according to a password reset request of the device.

In one example, the cloud service client may be a client installed on a user's smartphone or personal computer.

step 102: the cloud server determining whether the device serial number is bound to a cloud service account of the cloud service client, and sending the encryption challenge string to a password server when it is determined that the device serial number is bound to a cloud service account of the cloud service client.

Each cloud service client can correspond to a unique cloud service account. The user needs to bind the device to the cloud service account in advance to perform password recovery. For example, if the device is not bound to the cloud service account, the user can be prompted to bind the cloud service account during the startup of the device. If the cloud server determines that the device serial number is not bound to the cloud service account of the cloud service client, no subsequent processing will be performed. In one example, in the case that the device serial number is not bound to the cloud service account of the cloud service client, an error prompt message may also be displayed on the cloud service client.

Wherein, the binding process of the device serial number and the cloud service account is performed before step 101. In an example, the binding process is as follows:

the cloud server receives a cloud service account binding request carrying the device serial number and device verification code of the device sent by the cloud service client; the cloud server searches for the device serial number and device verification code in a registered device list stored by itself, and the device serial number is bound to a cloud service account of the cloud service client when the device serial number and the device verification code are found.

In one example, the device verification code may be solidified into the device when the device leaves factory, and device verification codes of different devices are different.

In one example, the device can generate a QR code containing the device serial number and device verification code, and the user scans the QR code through the mobile phone installed with the cloud service client, so that the cloud service client can obtain the device serial number and device verification code. In one example, in the case that the device has a communication function, a communication connection between the cloud service client and the device can be directly established, so that the cloud service client can obtain the device serial number and the device verification code. After obtaining the device serial number and device verification code, the cloud service client can generate a cloud service account binding request.

In the registered device list stored by the cloud server, the device serial number and device verification code of the device used for registration are recorded. In one example, the device manufacturer can transmit the device serial number and device verification code of the device to the cloud server for storage when the device leaves factory; in one example, during the activation and use of the device, the device needs to be registered in the cloud server, send the device serial number and device verification code to the cloud server, so as to update the registered device list of the cloud server.

In one example, after the cloud server finds the device serial number and device verification code in the registered device list stored by itself, the cloud server also needs to detect whether the device serial number is matched with and the device verification code, that is, whether the device serial number and the device verification code belong to the same device, the device serial number is bound to the cloud service account of the cloud service client when the device serial number is matched with the device verification code.

Step 103: the cloud server receiving the password recovery verification code returned by the password server which is decrypted from the encryption challenge string, and sending the password recovery verification code to the cloud service client, so that the cloud service client displays the password recovery verification code to a user.

For example, the cloud service client can be installed on the user's smartphone or personal computer, and the cloud service client displays the password recovery verification code on the display of the smartphone or personal computer.

After that, the user can enter the password recovery verification code into the device, and the device matches the password recovery verification code entered by the user with the password recovery verification code generated and stored by itself. If the two are the same, the user will be notified to enter a reset password and execute the password reset process.

In the above embodiment, when the user forgets the device login password, for the cloud service account to which the device is bound, during recovering the device login password, the binding relationship is verified by the cloud server, if the verification is passed, the encryption challenge string encrypted by the password recovery verification code randomly generated by the device will be sent to the password server for decryption to obtain the password recovery verification code, so that the device login password recovery can be realized without any pre-setting by the user in addition to binding the device to the cloud service account, which improves the convenience and reliability of the password recovery.

In the above embodiment, the binding relationship between the verification device and the cloud service account is performed by the cloud server. In practical applications, the binding relationship can also be verified by the cloud service client, as shown in the following embodiments:

FIG. 2 is a flow diagram of a password recovery method provided by a second embodiment of the present application, and its specific steps are as follows.

Step 201: a cloud service client obtaining a device serial number and an encryption challenge string from a device; wherein, the encryption challenge string is encrypted by a password recovery verification code randomly generated by the device;

In one example, in the case that the device has a communication function, a cloud service client can be used to directly establish a communication connection with the device, so as to obtain the device serial number and the encryption challenge string of the device. In one example, the device can be used to generate a QR code containing the device serial number and the encryption challenge string, and the user scans the QR code through the mobile phone installed with the cloud service client, so that the cloud service client can obtain the device serial number and the encryption challenge string.

Step 202: the cloud service client determining whether the device serial number is bound to a cloud service account of the cloud service client, and sending the encryption challenge string to a password server via a cloud server through a password recovery request carrying the encryption challenge string when it is determined that the device serial number is bound to a cloud service account of the cloud service client.

If the cloud service client determines that the device serial number is not bound to the cloud service account of the cloud service client, no subsequent processing will be performed. In one example, in the case that the device serial number is not bound to the cloud service account of the cloud service client, an error prompt message may also be displayed on the cloud service client.

Wherein, the binding process of the device serial number and the cloud service account is performed before step 201, which is specifically as follows:

The cloud service client sends a cloud service account binding request carrying the device serial number and device verification code to the cloud server; the cloud service client receives a binding success response returned by the cloud server and adds the device serial number to its own cloud service account binding device list. The cloud server receives a cloud service account binding request carrying the device serial number and device verification code of the device sent by the cloud service client; the cloud server searches for the device serial number and device verification code in a registered device list stored by itself, and the binding success response is sent to the cloud service client when the device serial number and device verification code are found.

Step 203: the cloud service client receiving the password recovery verification code sent by the cloud server, wherein the password recovery verification code is decrypted by the password server from the encryption challenge string.

Step 204: the cloud service client displaying the password recovery verification code to a user.

In the above embodiment, for the cloud service account to which the device is bound, during recovering the device login password, the binding relationship is verified by the cloud server, if the verification is passed, the encryption challenge string encrypted by the password recovery verification code randomly generated by the device will be sent to the password server for decryption. While improving the convenience and reliability of password recovery, since the verification of the binding relationship is performed on various cloud service clients, which greatly reduces the processing burden of the cloud server.

In the above two embodiments, the cloud service client obtains the encryption challenge string from the device, and then sends the encryption challenge string to the password server via the cloud server. In practical applications, there may be a situation where direct communication between the cloud service client and the device may not be possible. In view of this situation, the application gives the following solutions:

FIG. 3 is a flow diagram of a password recovery method provided by a third embodiment of the present application, and its specific steps are as follows.

Step 301: a cloud server receiving an encryption challenge string obtaining request carrying a device serial number sent by a cloud service client; the encryption challenge string obtaining request is sent by the cloud service client after receiving a login password recovery request for a device input by a user.

When the cloud service client cannot directly communicate with the device whose password is to be recovered, the user can send an encryption challenge string obtaining request to the cloud server through the cloud service client, wherein the encryption challenge string obtaining request includes the device serial number of the device whose password is to be recovered.

Step 302: the cloud server determining whether the device serial number is bound to a cloud service account of the cloud service client, and obtaining an encryption challenge string from the device when it is determined that the device serial number is bound to a cloud service account of the cloud service client, wherein the encryption challenge string is encrypted by a password recovery verification code randomly generated by the device.

If the cloud server determines that the device serial number is not bound to the cloud service account of the cloud service client, no subsequent processing will be performed.

Wherein, the binding process of the device serial number and the cloud service account is performed before step 301, which is specifically as follows:

the cloud server receiving a cloud service account binding request carrying the device serial number and the device verification code of the device sent by the cloud service client; the cloud server searching for the device serial number and the device verification code in a registered device list stored by itself, and binding the device serial number to a cloud service account of the cloud service client when the device serial number and the device verification code are found.

Step 303: the cloud server sending the encryption challenge string to a password server.

Step 304: the cloud server receiving the password recovery verification code returned by the password server, and sending the password recovery verification code to the cloud service client, so that the cloud service client displays the password recovery verification code to the user.

In the above embodiment, after the cloud server verifies the binding relationship between the device and the cloud service account, the cloud server obtains the encryption challenge string from the device, and directly sends it to the password server for decryption, so that the device login password can still be recovered when the cloud service client cannot communicate with the device.

Based on the embodiments shown in FIG. 1 to FIG. 3, the cloud service client displays the password recovery verification code to the user, so that the device password can be recovered by using the password recovery verification code. In one example, the user can enter the password recovery verification code into the device, and the device matches the password recovery verification code entered by the user with the password recovery verification code generated and stored by itself. If the two are the same, the user will be notified to enter the reset password and execute a password reset process.

FIG. 4 is a flow diagram of a method for binding a cloud service account to a device provided by to a fourth embodiment of the present application, and its specific steps are as follows.

Step 401: a cloud service client obtaining a cloud service account assigned by a cloud server through successfully registering the cloud service with the cloud server.

Step 402: the device sending a registration request carrying the device serial number and device verification code of the device to the cloud server.

The device verification code is randomly generated before the device leaves factory, and is configured on the device when the device leaves factory.

Step 403: the cloud server receiving the registration request, and searching the device verification code carried by the registration request in a legal device verification code list stored by itself, it is determined that the device is successfully registered when the device verification code is found, and storing the device serial number and device verification code in the registered device list.

Step 404: when the cloud service client wants to bind the device to its cloud service account, the cloud service client obtaining the device serial number and device verification code of the device, and sending the device serial number and device verification code to a cloud server via its own cloud service account through the cloud service account binding request carrying the device serial number and device verification code.

The device can generate a QR code from its own device serial number and device verification code, and display the QR code to the cloud service client. The cloud service client scans the QR code to obtain the device serial number and device verification code of the device.

Step 405: the cloud server receiving the cloud service account binding request, searching for the device serial number and device verification code carried by the binding request in a registered device list, binding the device serial number to a cloud service account of the cloud service client when the device serial number and device verification code are found, and returning a binding success response to the cloud service client.

Step 406: the cloud service client receiving the binding success response and adding the device serial number to its own cloud service account binding device list.

FIG. 5 is a flow diagram of a password recovery method provided by a fifth embodiment of the present application, and its specific steps are as follows.

Step 501: after a device that has registered a cloud service detecting that a user has clicked a cloud service password recovery button, the device randomly generating a password recovery verification code, storing the password recovery verification code, and encrypting the password recovery verification code through an encryption algorithm agreed with a password server to obtain an encryption challenge string, combining its own device serial number and the encryption challenge string to generate a password recovery QR code, and displaying the password recovery QR code.

The encryption algorithm for encrypting the password recovery verification code is not limited in this application, as long as the device is agreed with the password server in advance. For example, the encryption process may include: randomly generating a key, then encrypting the password recovery verification code using an agreed encryption algorithm, and combining the key and the encrypted password recovery verification code into an encryption challenge string.

Step 502: after the cloud service client scans a password recovery QR code generated by the corresponding device, sending content of the QR code to a cloud server via the cloud service client's own cloud service account through the password recovery request carrying the content of the QR code.

Step 503: the cloud server receiving the password recovery request, and parsing the content of the QR code carried in the request to obtain the device serial number and the encryption challenge string; the cloud server searching for the device serial number bound under the cloud service account according to the cloud service account of the cloud service client, and determining whether the parsed device serial number is bound under the cloud service account, if yes, then sending the parsed encryption challenge string to the password server by carrying the same in the password recovery request.

Step 504: the password server receiving the password recovery request, decrypting the encryption challenge string in the request through a decryption algorithm corresponding to the agreed encryption algorithm to obtain a password recovery verification code, and returning the password recovery verification code to the cloud service client through the cloud server.

For example, the decryption process includes: parsing the encryption challenge string to obtain the key and the encrypted password recovery verification code, performing the decryption algorithm corresponding to the agreed encryption algorithm for the password and the encrypted password recovery verification code to obtain the original password recovery verification code.

Step 505: the cloud service client receiving the password recovery verification code, displaying the password recovery verification code to the user.

Step 506: the device receiving the password recovery verification code input by the user, matching the password recovery verification code with the password recovery verification code stored by the step 501, and notifying the user to enter a reset password when the two are match.

In practical applications, the device is configured with a valid duration of the password recovery verification code. In the step 501, when the device generates and stores the password recovery verification code, a verification code valid timer is started, and a timing duration is equal to the valid duration of the password recovery verification code; when the timer expires, the password recovery verification code stored by itself is deleted.

FIG. 6 is a flow diagram of a password recovery method provided by a sixth embodiment of the present application, and its specific steps are as follows.

Step 601: after a device that has registered a cloud service detecting that a user has clicked a cloud service password recovery button, the device randomly generating a password recovery verification code, storing the password recovery verification code, and encrypting the password recovery verification code through an encryption algorithm agreed with a password server to obtain an encryption challenge string, combining its own device serial number and the encryption challenge string to generate a password recovery QR code, and displaying the password recovery QR code.

The encryption algorithm for encrypting the password recovery verification code is not limited in this application, as long as the device is agreed with the password server in advance. For example, the encryption process may be: randomly generating a key, then encrypting the password recovery verification code using an agreed encryption algorithm, and combining the key and the encrypted password recovery verification code into an encryption challenge string.

Step 602: the cloud server scanning a password recovery QR code generated by the corresponding device to obtain the device serial number and the encryption challenge string; the cloud server determining whether the obtained device serial number is bound under the cloud service account according to the cloud service account binding device list stored by itself, if yes, then sending the obtained encryption challenge string to the cloud server by carrying the same in the password recovery request.

Step 603: the cloud server receiving the password recovery request, and sending the password recovery request to the password server.

Step 604: the password server receiving the password recovery request, decrypting the encryption challenge string in the request through a decryption algorithm corresponding to the agreed encryption algorithm to obtain a password recovery verification code, and returning the password recovery verification code to the cloud service client through the cloud server.

Step 605: the cloud service client receiving the password recovery verification code, and displaying the password recovery verification code to the user.

Step 606: the device receiving the password recovery verification code input by the user, matching the password recovery verification code with the password recovery verification code stored by the step 601, and notifying the user to enter the reset password if the two are match.

In practical applications, the device is configured with a valid duration of the password recovery verification code. In the step 601, when the device generates and stores the password recovery verification code, a verification code valid timer is started, and a timing duration is equal to the valid duration of the password recovery verification code; when the timer expires, the password recovery verification code stored by itself is deleted.

FIG. 7 is a flow diagram of a password recovery method provided by a seventh embodiment of the present application, and its specific steps are as follows.

Step 701: when a user forgets the login password of the device, entering a device login password recovery request for the device on the cloud service client, the cloud service client sending the device serial number to a cloud server via its own cloud service account through the encryption challenge string obtaining request carrying the device serial number of the device.

Step 702: the cloud server receiving the encryption challenge string obtaining request, searching for the device serial number bound under its own cloud service account according to the device serial number carried in the request and the cloud service account of the cloud service client, and determining whether the device serial number is bound under the cloud service account, sending the encryption challenge string obtaining request to the corresponding device when it is determined that the device serial number is bound under the cloud service account.

Step 703: the device receiving the encryption challenge string obtaining request, randomly generating a password recovery verification code, storing the password recovery verification code, and encrypting the password recovery verification code through an encryption algorithm agreed with the password server to obtain an encryption challenge string, and returning the encryption challenge string to the cloud server.

Step 704: the cloud server sending the encryption challenge string to a password server.

Step 705: the password server receiving the encryption challenge string, decrypting the encryption challenge string through a decryption algorithm corresponding to the agreed encryption algorithm to obtain a password recovery verification code, and returning the password recovery verification code to the cloud service client through the cloud server.

For example, the decryption process includes: parsing the encryption challenge string to obtain a key and the encrypted password recovery verification code, performing a decryption algorithm corresponding to the agreed encryption algorithm for the password and the encrypted password recovery verification code to obtain the original password recovery verification code.

Step 706: the cloud service client receiving the password recovery verification code, displaying the password recovery verification code to the user.

Step 707: the device receiving the password recovery verification code input by the user, matching the password recovery verification code with the password recovery verification code stored by the step 703, and notifying the user to enter the reset password the two are match.

In practical applications, the device is configured with a valid duration of the password recovery verification code. In the step 703, when the device generates and stores the password recovery verification code, a verification code valid timer is started, and a timing duration is equal to the valid duration of the password recovery verification code; when the timer expires, the password recovery verification code stored by itself is deleted.

FIG. 8 is a schematic structure diagram of a cloud server provided by an embodiment of the present application; the cloud server includes: a processor 82 and a memory 81 accessible to the processor. The memory 81 stores instructions, which, when executed by the processor 82, cause the processor to implement steps performed by the cloud server in the method described in any one of the first to seventh embodiments.

FIG. 9 is a schematic structure diagram of an electronic device provided by an embodiment of the present application; the electronic device includes: a processor 92 and a memory 91 accessible to the processor. The memory 91 stores instructions, which, when executed by the processor 92, cause the processor 92 to implement steps performed by the cloud service client in the method described in any one of the first to seventh embodiments.

In practical applications, the electronic device is a fixed terminal or a mobile terminal.

Figure 10:
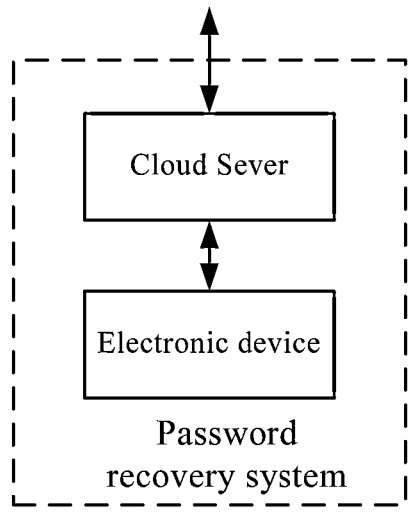
FIG. 10 is a schematic structure diagram of a password recovery system provided by an embodiment of the present application.

FIG. 10 is a schematic structure diagram of a password recovery system provided by an embodiment of the present application, wherein the system includes: the above-mentioned cloud server and the above-mentioned electronic device.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A password recovery method, comprising:

receiving, by a cloud server, a login password recovery request for a device sent by a cloud service client, the login password recovery request for the device carrying a device serial number and an encryption challenge string; wherein, the encryption challenge string is obtained by encrypting a password recovery verification code randomly generated by the device;

determining, by the cloud server, whether the device serial number is bound to a cloud service account of the cloud service client, and sending the encryption challenge string to a password server when the cloud server determined that the device serial number is bound to the cloud service account of the cloud service client;

receiving, by the cloud server, the password recovery verification code returned by the password server, the received password recovery verification code being decrypted from the encryption challenge string, and sending the received password recovery verification code to the cloud service client, so that the cloud service client displays the received password recovery verification code to a user, wherein the displayed password recovery verification code is input to the device by the user and is matched with the password recovery verification code randomly generated and stored by the device, responsive to determining that the displayed password verification code input to the device by the user and the password verification code randomly generated and stored by the device are the same, a password reset process is executed.

2. The method of claim 1, wherein before receiving, by the cloud server, the login password recovery request for the device by the cloud service client, the login password recovery request for the device carrying the device serial number and the encryption challenge string, the method further comprises:

receiving, by the cloud server, a cloud service account binding request carrying the device serial number of the device and a device verification code sent by the cloud service client;

searching, by the cloud server, for the device serial number and the device verification code in a registered device list stored by itself, and binding the device serial number to the cloud service account of the cloud service client when the device serial number and the device verification code are found.

3. A cloud server, comprising a processor and a memory accessible to the processor, instructions are stored in the memory, which, when executed by the processor, cause the processor to perform steps of the method of claim 2.

4. A cloud server, comprising a processor and a memory accessible to the processor, instructions are stored in the memory, which, when executed by the processor, cause the processor to perform steps of the method of claim 1.

5. A password recovery method, comprising:

obtaining, by a cloud service client, a device serial number and an encryption challenge string from a device; wherein, the encryption challenge string is obtained by encrypting a password recovery verification code randomly generated by the device;

determining, by the cloud service client, whether the device serial number is bound to a cloud service account of the cloud service client, and sending the encryption challenge string to a password server via a cloud server through a password recovery request carrying the encryption challenge string when the cloud service client determined that the device serial number is bound to the cloud service account of the cloud service client;

receiving, by the cloud service client, the password recovery verification code sent by the cloud server, wherein the received password recovery verification code is decrypted by the password server from the encryption challenge string;

displaying, by the cloud service client, the received password recovery verification code to a user, wherein the displayed password recovery verification code is input to the device by the user and is matched with the password recovery verification code randomly generated and stored by the device, responsive to determining that the displayed password verification code input to the device by the user and the password verification code randomly generated and stored by the device are the same, a password reset process is executed.

6. The method of claim 5, wherein, before receiving, by the cloud service client, a device login password recovery request for the device input by the user, the method further comprises:

sending, by the cloud service client, a cloud service account binding request carrying the device serial number and a device verification code of the device to the cloud server;

receiving, by the cloud service client, a binding success response returned by the cloud server, and adding the device serial number to its own cloud service account binding device list.

7. An electronic device comprising a processor and a memory accessible to the processor, instructions are stored in the memory, which, when executed by the processor, cause the processor to perform steps of the method of claim 6.

8. An electronic device comprising a processor and a memory accessible to the processor, instructions are stored in the memory, which, when executed by the processor, cause the processor to perform steps of the method of claim 5.

9. The electronic device of claim 8, wherein the electronic device is a fixed terminal or a mobile terminal.

10. A password recovery method, comprising:

receiving, by a cloud server, an encryption challenge string obtaining request carrying a device serial number sent by a cloud service client; the encryption challenge string obtaining request is sent by the cloud service client after receiving a device login password recovery request for a device input by a user;

determining, by the cloud server, whether the device serial number is bound to a cloud service account of the cloud service client, and obtaining an encryption challenge string from the device when the cloud server determined that the device serial number is bound to the cloud service account of the cloud service client, wherein the encryption challenge string is obtained by encrypting a password recovery verification code randomly generated by the device;

sending, by the cloud server, the encryption challenge string to a password server;

receiving, by the cloud server, the password recovery verification code returned by the password server, and sending the received password recovery verification code to the cloud service client, so that the cloud service client displays the received password recovery verification code to the user, wherein the displayed password recovery verification code is input to the device by the user and is matched with the password recovery verification code randomly generated and stored by the device, responsive to determining that the displayed password verification code input to the device by the user and the password verification code randomly generated and stored by the device are the same, a password reset process is executed.

11. The method of claim 10, wherein before receiving, by the cloud server, the encryption challenge string obtaining request carrying the device serial number sent by the cloud service client, the method further comprises:

receiving, by the cloud server, a cloud service account binding request carrying the device serial number and a device verification code of the device sent by the cloud service client;

searching, by the cloud server, for the device serial number and the device verification code in a registered device list stored by itself, and binding the device serial number to the cloud service account of the cloud service client when the device serial number and the device verification code are found.

12. A cloud server, comprising a processor and a memory accessible to the processor, instructions are stored in the memory, which, when executed by the processor, cause the processor to perform steps of the method of claim 11.

13. A cloud server, comprising a processor and a memory accessible to the processor, instructions are stored in the memory, which, when executed by the processor, cause the processor to perform steps of the method of claim 10.

\* \* \* \* \*